US009734066B1

(12) United States Patent
Indupuru et al.

(10) Patent No.: US 9,734,066 B1
(45) Date of Patent: Aug. 15, 2017

(54) WORKLOAD-BASED ADJUSTABLE CACHE SIZE

(71) Applicant: SK hynix memory solutions inc., San Jose, CA (US)

(72) Inventors: Suneel Kumar Indupuru, Cupertino, CA (US); Zheng Wu, San Jose, CA (US); Arunkumar Subramanian, San Jose, CA (US); Jason Bellorado, San Jose, CA (US)

(73) Assignee: SK hynix memory solutions Inc., San Jose, CA (US)

( * ) Notice: Subject to any disclaimer, the term of this patent is extended or adjusted under 35 U.S.C. 154(b) by 149 days.

(21) Appl. No.: 14/632,725

(22) Filed: Feb. 26, 2015

Related U.S. Application Data

(60) Provisional application No. 62/001,781, filed on May 22, 2014.

(51) Int. Cl.
*G06F 12/10* (2016.01)
*G06F 12/0831* (2016.01)
*G06F 12/128* (2016.01)

(52) U.S. Cl.
CPC ........ *G06F 12/0833* (2013.01); *G06F 12/128* (2013.01); *G06F 2212/62* (2013.01); *G06F 2212/69* (2013.01)

(58) Field of Classification Search
None
See application file for complete search history.

(56) References Cited

U.S. PATENT DOCUMENTS

| 6,141,731 A * | 10/2000 | Beardsley | G06F 12/127 711/133 |
| 7,818,725 B1 * | 10/2010 | Agarwal | G06F 15/17318 717/136 |
| 8,621,145 B1 * | 12/2013 | Kimmel | G06F 12/0246 711/103 |
| 2002/0069329 A1 * | 6/2002 | James | G06F 12/1027 711/135 |
| 2002/0108017 A1 * | 8/2002 | Kenchammana-Hoskote | G06F 12/0804 711/113 |
| 2002/0156980 A1 * | 10/2002 | Rodriguez | G06F 12/121 711/136 |
| 2004/0205296 A1 * | 10/2004 | Bearden | G06F 12/0866 711/129 |
| 2005/0071559 A1 * | 3/2005 | Tamura | G06F 3/0607 711/117 |
| 2005/0108496 A1 * | 5/2005 | Elnozahy | G06F 12/1045 711/203 |
| 2006/0080506 A1 * | 4/2006 | Rajamony | G06F 12/0813 711/119 |

(Continued)

*Primary Examiner* — Mano Padmanabhan
*Assistant Examiner* — Jean Edouard
(74) *Attorney, Agent, or Firm* — IP & T Group LLP

(57) ABSTRACT

A workload level associated with an expandable data buffer is determined, where the expandable data buffer and an expandable mapping table cache are stored in internal memory and the expandable mapping table cache is used to store a portion of a mapping table that is stored on external storage. An amount of internal memory allocated to the expandable data buffer and an amount of internal memory allocated to the expandable mapping table cache are adjusted based at least in part on the workload level.

18 Claims, 12 Drawing Sheets

(56) References Cited

U.S. PATENT DOCUMENTS

| | | | |
|---|---|---|---|
| 2007/0067604 A1* | 3/2007 | Elnozahy | G06F 12/1045 711/207 |
| 2007/0156964 A1* | 7/2007 | Sistla | G06F 12/121 711/133 |
| 2009/0240880 A1* | 9/2009 | Kawaguchi | G06F 3/0617 711/114 |
| 2010/0169604 A1* | 7/2010 | Trika | G06F 12/0246 711/170 |
| 2010/0274961 A1* | 10/2010 | Golla | G06F 9/384 711/108 |
| 2010/0274993 A1* | 10/2010 | Golla | G06F 9/30109 712/216 |
| 2010/0293420 A1* | 11/2010 | Kapil | G06F 12/08 714/710 |
| 2010/0299508 A1* | 11/2010 | Luttrell | G06F 9/3824 712/234 |
| 2011/0072235 A1* | 3/2011 | Deming | G06F 12/1027 711/207 |
| 2011/0173395 A1* | 7/2011 | Bhattacharjee | G05D 23/19 711/135 |
| 2011/0197035 A1* | 8/2011 | Na | G06F 3/0613 711/154 |
| 2011/0276762 A1* | 11/2011 | Daly | G06F 12/0804 711/122 |
| 2012/0191913 A1* | 7/2012 | Damodaran | H03K 19/0016 711/122 |
| 2013/0124794 A1* | 5/2013 | Bux | G06F 12/0246 711/103 |
| 2013/0138884 A1* | 5/2013 | Kawamura | G06F 12/0866 711/119 |
| 2014/0032831 A1* | 1/2014 | Asamoto | G06F 12/122 711/108 |
| 2014/0032873 A1* | 1/2014 | Ozdemir | G06F 13/16 711/202 |
| 2014/0089629 A1* | 3/2014 | Griffin | G06F 12/1009 711/173 |
| 2014/0095771 A1* | 4/2014 | Lee | G06F 12/0804 711/103 |
| 2014/0095773 A1* | 4/2014 | Griffin | G06F 12/1009 711/103 |
| 2014/0095827 A1* | 4/2014 | Wei | G06F 12/0246 711/203 |
| 2014/0181377 A1* | 6/2014 | Kimmel | G06F 12/0246 711/103 |
| 2014/0189263 A1* | 7/2014 | Shaharabany | G06F 5/14 711/154 |
| 2015/0006823 A1* | 1/2015 | Smith, Jr. | G06F 12/0891 711/135 |
| 2015/0039836 A1* | 2/2015 | Wang | G06F 12/0804 711/136 |
| 2015/0355861 A1* | 12/2015 | Jayaraman | G06F 3/0613 711/103 |

\* cited by examiner

United States Patent US 9,734,066 B1

WORKLOAD-BASED ADJUSTABLE CACHE SIZE

CROSS REFERENCE TO OTHER APPLICATIONS

This application claims priority to U.S. Provisional Patent Application No. 62/001,781 entitled WORKLOAD-BASED DYNAMIC L2 CACHE-SIZING filed May 22, 2014 which is incorporated herein by reference for all purposes.

BACKGROUND OF THE INVENTION

Solid state storage (e.g., NAND storage) is becoming increasingly popular. In particular, solid state storage is attractive for mobile systems, because solid state storage is able to be incorporated into smaller systems compared to some other types of storage, such as magnetic storage. It would be desirable if the performance of such systems could be improved. For example, it would be desirable if the amount of time required to read data from solid state storage in a mobile system could be improved.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
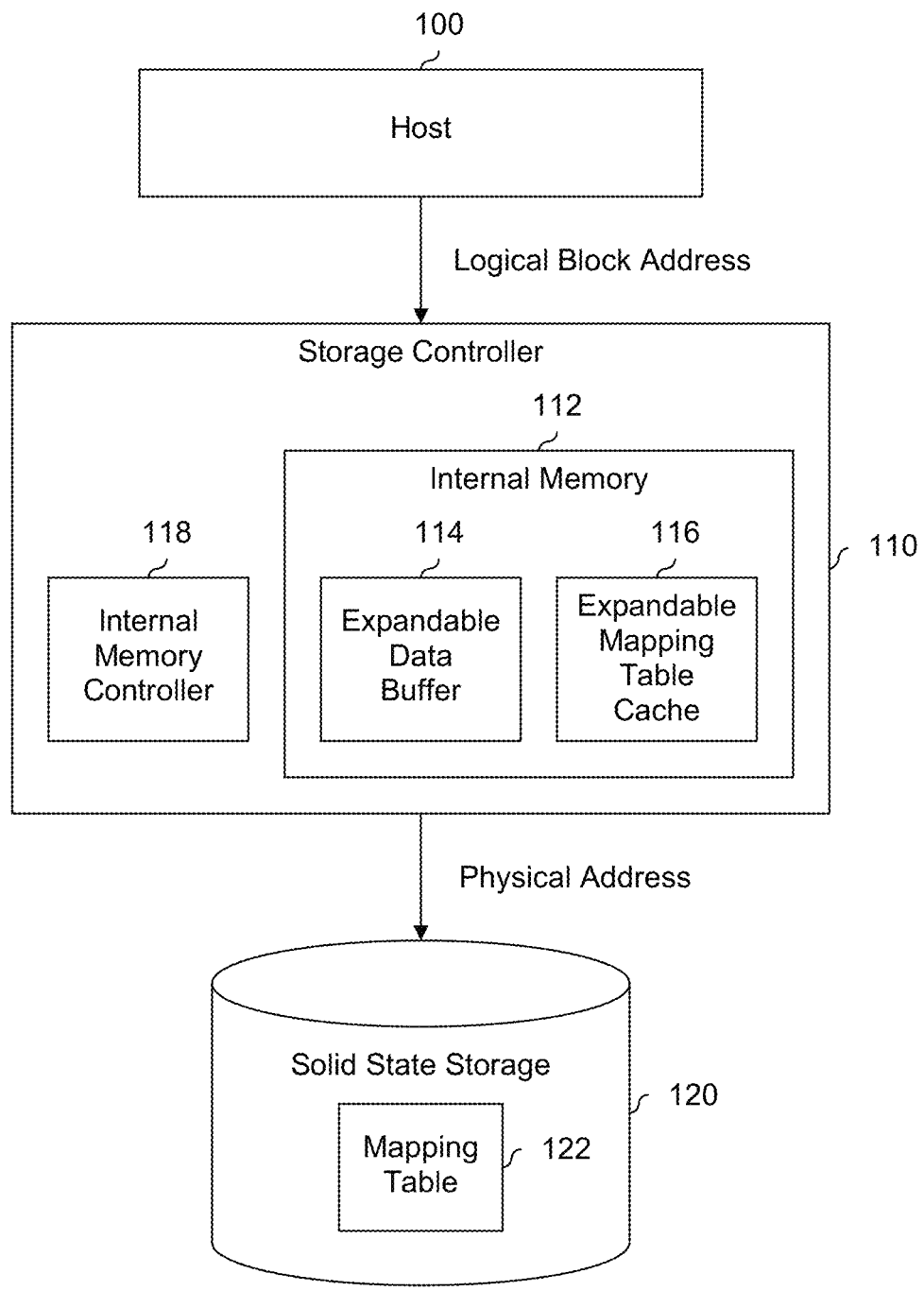
FIG. 1 is a diagram illustrating an embodiment of a solid state storage system which includes an expandable mapping table cache.

FIG. 1 is a diagram illustrating an embodiment of a solid state storage system which includes an expandable mapping table cache. In the example shown, host 100 communicates with storage controller 110, which in turn communicates with solid state storage 120. In some embodiments, storage controller 110 comprises a semiconductor device, such as an application-specific integrated circuit (ASIC) or a field-programmable gate array (FPGA)). For simplicity, solid state storage 120 is shown as a single device, but in some embodiments solid state storage 120 comprises multiple semiconductor devices. In some embodiments, solid state storage 120 includes NAND Flash.

In the example shown, host 100 sends read instructions and write instructions (not shown) to storage controller 110 which include logical addresses, specifically logical block addresses (at least in this example). In contrast, the read instructions and write instructions (not shown) passed from storage controller 110 to solid state storage 120 include physical addresses.

To keep track of what physical addresses correspond to what logical block addresses, a mapping table is used to store the mapping. Solid state storage systems in particular must keep track of the mapping between logical addresses and physical addresses compared to some other types of storage systems (e.g., magnetic storage) because of the access characteristics specific to solid state storage. Unlike magnetic storage, for example, solid state storage does not support in-place updates because the erase operation can only take place on a block basis, where a block contains many logical block addresses (e.g., 1024). As such, data which is to be overwritten is simply marked as invalid, and the new data sequence is written elsewhere. Over time, many logical block addresses in a given block become invalid and eventually the remaining valid data is moved to another location so that the block can be reclaimed. This operation is known as garbage collection. As a result, the physical address(es) which correspond to a given logical block address change over time as data becomes invalid and garbage collection is performed. Therefore, the storage controller must manage a logical to physical mapping table.

In embodiments described herein, the storage controllers have a relatively small amount of internal memory, so the entire mapping table cannot be kept on the storage controller. For example, a mapping table will be about 0.1% the size of the storage, so a 256 GB solid state storage drive will require a mapping table of 256 MB. In eMMC and UFS applications, a mapping table of that size is too big to be stored in its entirety in internal memory. As such, mapping table 122 is stored on solid state storage 120.

To improve performance, a cache (116) is stored in internal memory 112 which is used to store part of mapping table 122. This cache is referred to herein as an expandable mapping table cache. The cache is called an expandable cache because it is able to be expanded depending (at least in part) upon the workload of the system. More specifically, internal memory is reallocated from expandable data buffer 114 to expandable mapping table cache 116 when the workload of the system is light and expandable data buffer 114 is at least partially unused. In various embodiments, expandable data buffer 114 is a write buffer (e.g., for buffering write data received from host 100 before the write data is written to solid state storage 120) or a read buffer (e.g., for storing pre-fetched read data from solid state storage 120 that host 100 has not yet asked for but may ask for in the future). In one example where expandable data buffer 114 is a write buffer, some of the write buffer is reallocated to cache the mapping table if the write buffer is partially or completely empty and the system is in a short write mode (e.g., because the last write instruction received from host 100 is a short, non-burst write). If the write workload gets heavier (e.g., because host 100 starts sending more write instructions and/or larger write instructions to storage controller 110), internal memory can be reallocated from expandable mapping table cache 116 to expandable data buffer 114 to handle the heavier write workload.

Internal memory controller 118 is responsible for adjusting the size of expandable data buffer 114 and expandable mapping table cache 116 based on the workload level and, in some embodiments, other factors. For example, internal memory controller 118 will monitor the workload level by monitoring (e.g., continually and/or in real time) the instructions sent from host 100 to storage controller 110 and/or the degree to which expandable data buffer 114 is occupied to get a sense of the workload level. Depending upon the determined workload level (and, as described above, other factors in some embodiments), internal memory controller 118 adjusts the amount of internal memory allocated to expandable data buffer 114 and expandable mapping table cache 116. In some embodiments, the total amount of internal memory allocated to expandable data buffer 114 and expandable mapping table cache 116 remains constant, so that expandable data buffer 114 would be increased by the same amount of memory that expandable mapping table cache 116 is decreased by, and vice versa.

In some embodiments, internal memory controller 118 also tracks the number of hits for cache entries that have been recently evicted from the cache. These hit counts are used (e.g., in addition to the workload level) to decide whether to increase the size of expandable mapping table cache 116 (e.g., assuming that the workload level and the amount of unused expandable data buffer permit such an expansion). To put it another way, internal memory controller 118 will decide whether the cache hit rate is likely to increase if the size of the cache is increased. There is typically a non-zero cost associated with reallocating internal memory from the data buffer to the cache, so it may be desirable to do a cost-benefit analysis.

In some embodiments, expandable mapping table cache 116 keeps track of cache entries which are less expensive to discard (e.g., when internal memory controller 118 decides to reallocate internal memory from cache 116 to buffer 114) versus cache entries that are more expensive to discard. In such embodiments, cache entries that are less expensive to discard are discarded first when expandable mapping table cache 116 is downsized; once all of the less expensive cache entries have been discarded, then the more expensive cache entries are discarded.

For clarity, some elements not directly related to the technique are not shown herein. For example, the data stored on solid state storage 120 is not shown, nor does storage controller 110 show an error correction encoder/decoder, which is a common component in storage controllers. This is not intended to be limiting and real-world embodiments of the system may include components which are not shown herein, such as error correction encoders/decoders, etc.

Figure 2:
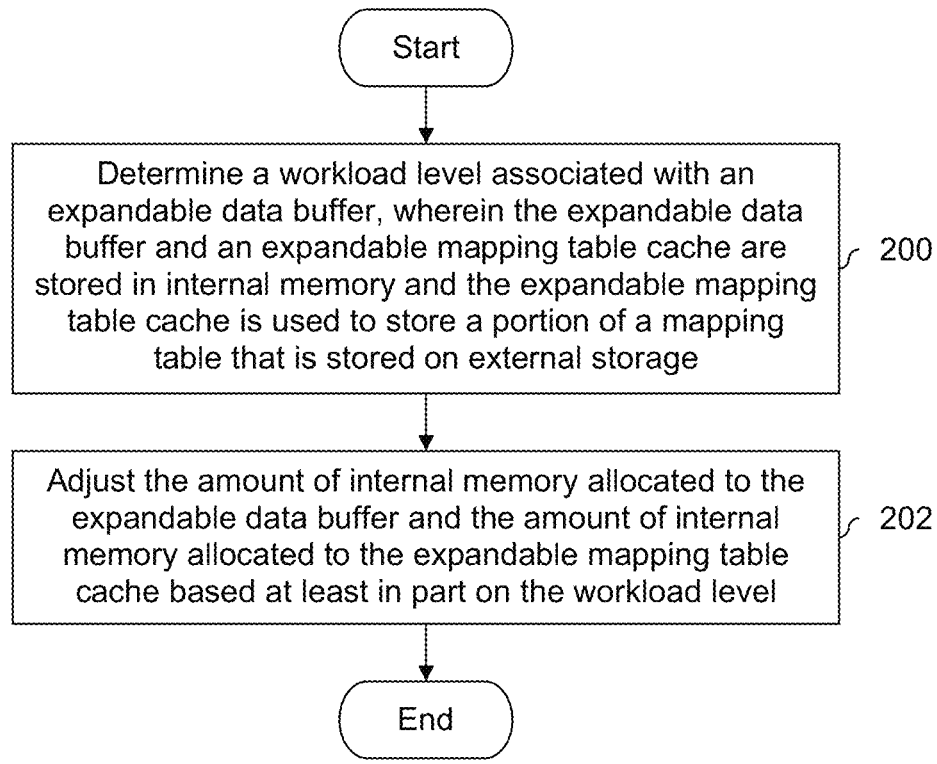
FIG. 2 is a flowchart illustrating an embodiment of a workload-based, internal memory reallocation process.

FIG. 2 is a flowchart illustrating an embodiment of a workload-based, internal memory reallocation process. In the example shown, one example of the monitoring and reallocation performed by internal memory controller 118 in FIG. 1 is shown.

At 200, a workload level associated with an expandable data buffer is determined, wherein the expandable data buffer and an expandable mapping table cache are stored in internal memory and the expandable mapping table cache is used to store a portion of a mapping table that is stored on external storage. In FIG. 1, for example, internal memory controller 118 determines a workload level associated with expandable data buffer 114. In that example, expandable data buffer 114 and expandable mapping table cache 116 are both stored on internal memory 112. Expandable mapping table cache 116 stores part of mapping table 122 (not shown) which is located on solid state storage 120.

At 202, the amount of internal memory allocated to the expandable data buffer and the amount of internal memory allocated to the expandable mapping table cache are adjusted based at least in part on the workload level. For example, internal memory may be shifted from the expandable mapping table cache to the expandable data buffer (causing the former to shrink in size and the latter to expand in size), or vice versa. In some embodiments, the total amount of internal memory allocated to the expandable mapping table cache and the expandable data buffer remains constant, even as the individual sizes of the two vary over time.

Figure 3:
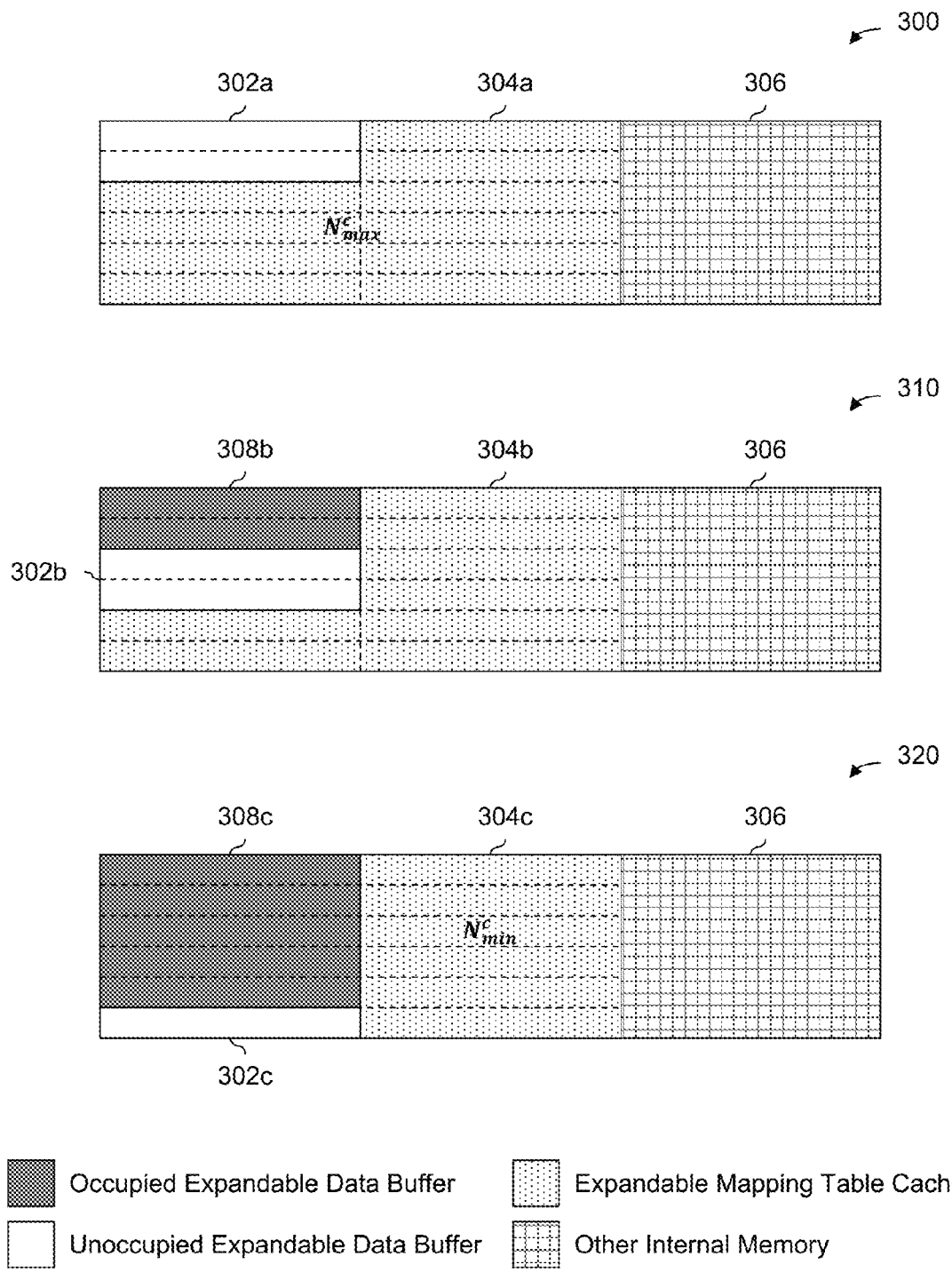
FIG. 3 is a diagram illustrating an embodiment of various allocations of internal memory to an expandable mapping table cache and an expandable data buffer.

FIG. 3 is a diagram illustrating an embodiment of various allocations of internal memory to an expandable mapping table cache and an expandable data buffer. For simplicity, the size of an entry in the expandable data buffer in this figure is the same size as an entry in the expandable mapping table cache.

In diagram 300, expandable mapping table cache (304a) has a maximum number of cache entries (i.e., $N_{max}^c=10$) allocated to it. Since diagram 300 shows a low workload state, there are no occupied entries in the expandable data buffer and there are two unoccupied entries (302a) in the expandable data buffer. For example, if the expandable data buffer is a write buffer, then the scenario shown in diagram 300 corresponds to no write data waiting to be written to the external storage (e.g., solid state storage on another semiconductor device). Put another way, diagram 300 shows an example of no outstanding writes. Or, if the expandable data buffer is a read buffer, there have not been recent read instructions so there is no need to pre-fetch read data. Internal memory allocated for other purposes is shown as portion 306. This is one example of a low workload level and a corresponding allocation of internal memory.

In diagram 310, the amount of internal memory allocated to the expandable mapping table cache has decreased compared to diagram 300, and the amount of internal memory allocated to the expandable data buffer has increased compared to diagram 300. In this example, there are two occupied entries in the expandable data buffer (308b), two unoccupied entries in the expandable data buffer (302b), and eight entries in the expandable mapping table cache (304b). This is one example of a medium workload level and a corresponding allocation of internal memory. For example, if the data buffer is a write buffer, then the number of write instructions sent by the host may comprise only a few write instructions and/or the amount of write data sent by the host may be relatively small (e.g., short writes versus long writes).

In diagram 320, there are five occupied entries in the expandable data buffer (308c), one unoccupied entry in the expandable data buffer (302c), and six entries in the expandable mapping table cache (304c), which is the minimum number of cache entries (i.e., $N_{min}^c=6$). This is one example of a high workload level and a corresponding allocation of internal memory. For example, the host may have sent many write instructions and/or long (e.g., burst) write instructions.

Figure 4:
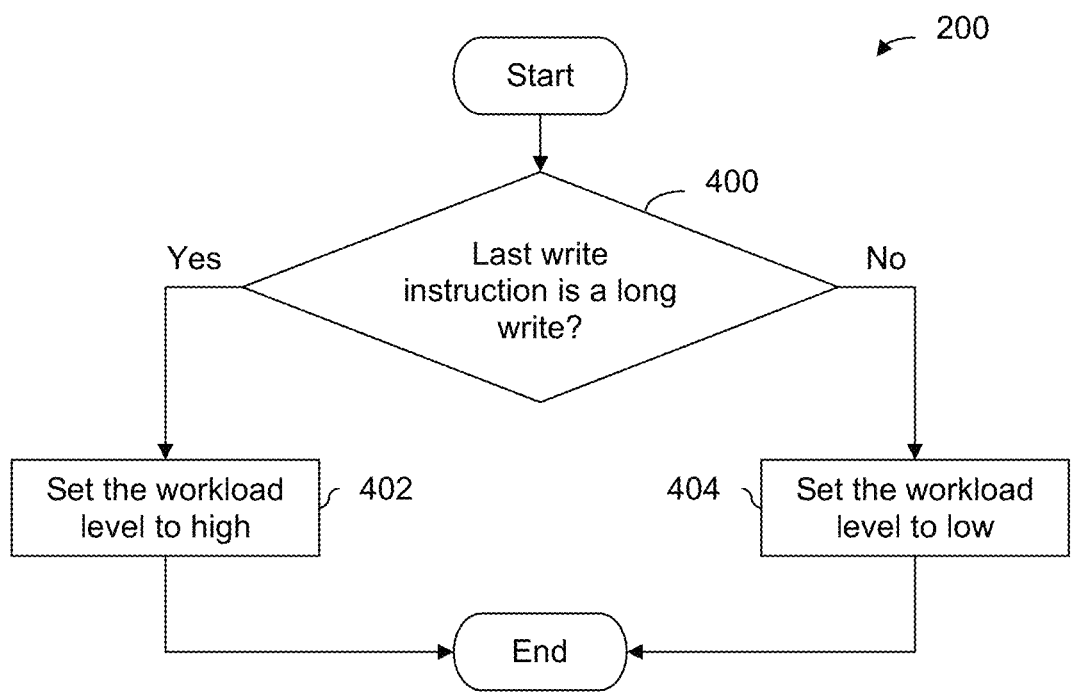
FIG. 4 is a flowchart illustrating an embodiment of a process for determining a workload level.

FIG. 4 is a flowchart illustrating an embodiment of a process for determining a workload level. In some embodiments, step 200 in FIG. 2 is performed in the following manner.

At 400, it is determined if a last write instruction is a long write. For example, in some systems, a host is able to perform a long sequential write, sometimes referred to as a block write or a burst write. In some embodiments, the amount of write data to be sent by the host to the storage controller is specified at the beginning of the long sequential write (e.g., a predefined-length block write). Alternatively, the amount of write data may be unspecified and the end of the sequential write is signaled by a "stop" signal (e.g., an open-ended block write). If the last write received from a host is such a long write, then the decision at step 400 is Yes.

If the last write instruction is a long write, than at 402 the workload level is set to high. If the last write instruction is a short write, than at 404 the workload level is set to low.

FIG. 4 is merely exemplary and is not intended to be limiting. For example, the number or percentage of (un)occupied entries in the data buffer is described below as being used to adjust the amounts of internal memory allocated to the data buffer versus the cache (e.g., at step 202 in FIG. 2). Naturally, some other embodiments may use the number or percentage of occupied entries in the data buffer when determining the workload level at step 200 in FIG. 2. Similarly, FIG. 4 only has two workload levels: low and high. In various embodiments, any number of workload levels may be determined.

Figure 5:
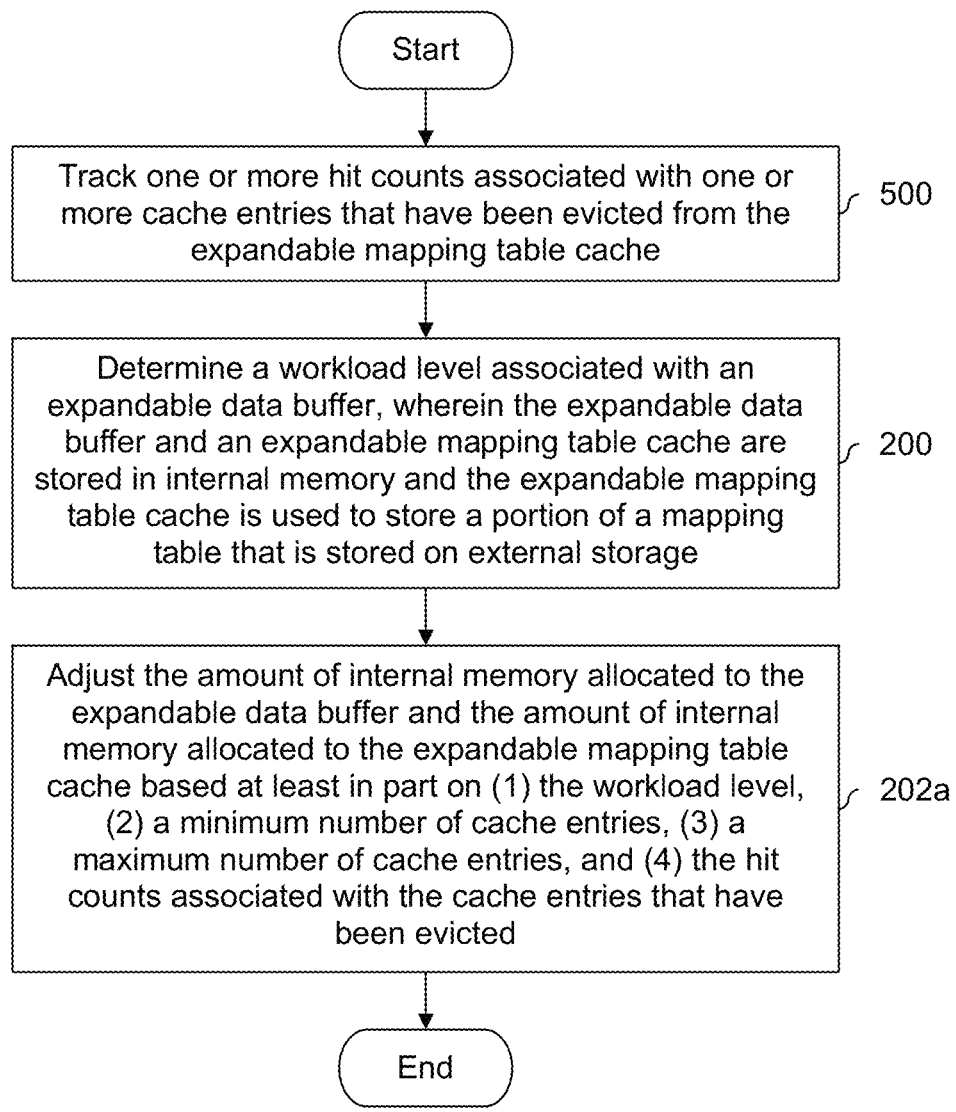
FIG. 5 is a flowchart illustrating an embodiment of a workload-based, internal memory reallocation process which takes into consideration hit counts associated with cache entries that have been evicted.

FIG. 5 is a flowchart illustrating an embodiment of a workload-based, internal memory reallocation process which takes into consideration hit counts associated with cache entries that have been evicted. FIG. 5 is similar to FIG. 2 and identical or similar reference numbers are used for related steps.

At 500, one or more hit counts associated with one or more cache entries that have been evicted from the expandable mapping table cache are tracked. In examples described herein, the hit counts are not tracking specific logical-to-physical address mapping per se, but rather track the number of hits for the current set of (most recently) evicted cache entries as that set varies over time. An example of this step is described in further detail below.

At 200, a workload level associated with an expandable data buffer is determined, wherein the expandable data buffer and an expandable mapping table cache are stored in internal memory and the expandable mapping table cache is used to store a portion of a mapping table that is stored on external storage.

At 202a, the amount of internal memory allocated to the expandable data buffer and the amount of internal memory allocated to the expandable mapping table cache are adjusted based at least in part on (1) the workload level, (2) a minimum number of cache entries, (3), a maximum number of cache entries, and (4) the hit counts associated with the cache entries that have been evicted. Diagram 300 in FIG. 3 shows an example of a maximum number of cache entries (in that example, $N_{max}^c=10$) and diagram 320 shows an example of a minimum number of cache entries (in that example, $N_{min}^c=6$). In some embodiments, step 202 in FIG. 2 is performed in the manner described in step 202a. An example of step 202a is described in further detail below.

There are a number of benefits to the exemplary process shown in this figure. First, the minimum number of cache entries ($N_{min}^c$) and the maximum number of cache entries ($N_{max}^c$) ensure that both the expandable data buffer and the expandable mapping table cache never go below a first and second minimum size.

Second, taking into consideration hit counts associated with cache entries that have been evicted is, conceptually speaking, like making a prediction or estimate of how many additional hits would be gained by adding additional entries to the expandable mapping table cache, and weighting that predicted benefit against the cost of shifting internal memory from the data buffer to the cache. If the hit count(s) is/are zero or are very close to zero, then there is little predicted benefit in expanding the mapping table cache and it may not be worth the associated cost (e.g., in processing resources, in power consumption, etc.) to expand the cache. Conversely, high hit count(s) corresponds to a prediction that there is a high utility or value in increasing the size of the cache and as such suggests that shifting internal memory to the cache from the data buffer is a worthwhile tradeoff.

Figure 6:
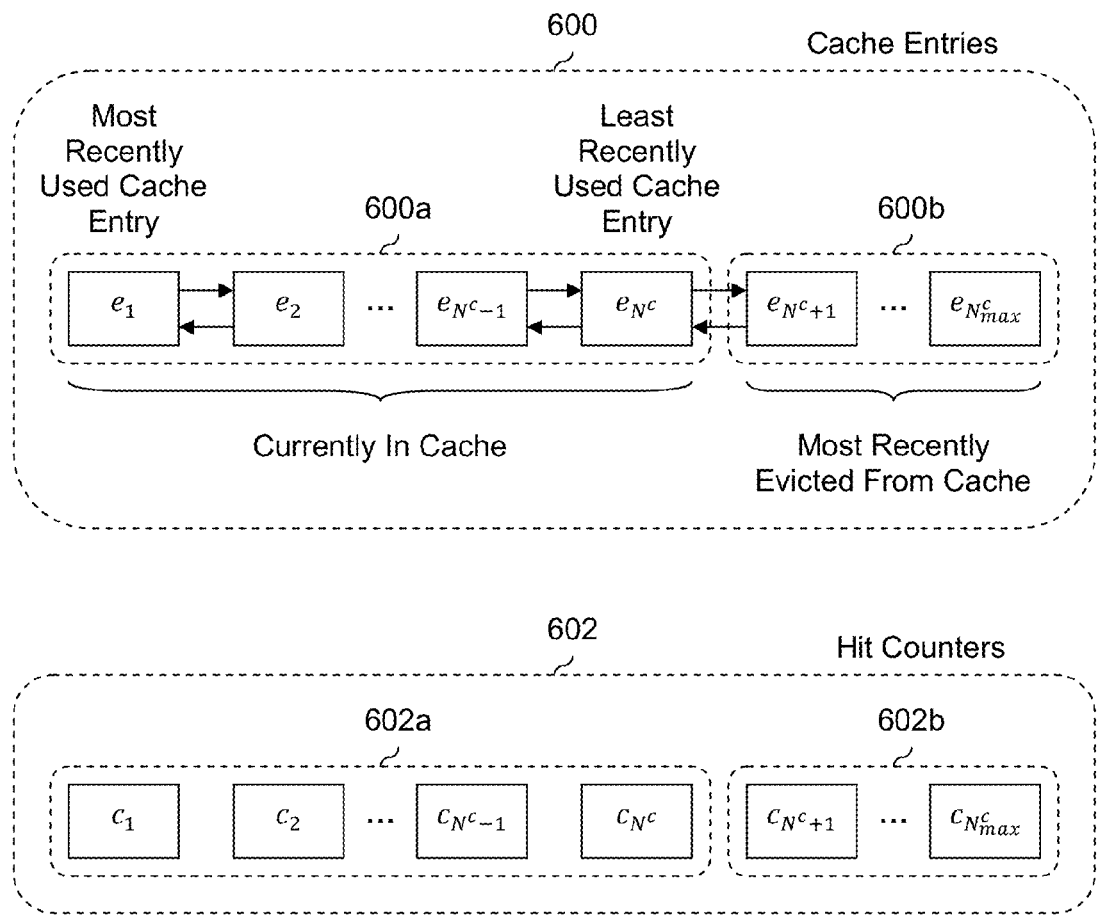
FIG. 6 is a diagram illustrating an embodiment of hit counters and an associated set of current, most recently evicted cache entries.

FIG. 6 is a diagram illustrating an embodiment of hit counters and an associated set of current, most recently evicted cache entries. The hit counts tracked by hit counters 602b are an example of the hit counts which are tracked at step 500 in FIG. 5 and which are used to reallocate internal memory at step 202a.

In the example shown, the number of hit counters equals the maximum number of entries that can reside in a cache (i.e., $N_{max}^c$). As such, there are $N_{max}^c$ cache entries in group 600 and $N_{max}^c$ hit counters in group 602. In some applications it is desirable to track $N_{max}^c$ hit counts because there will be information available, for all cache sizes, to decide whether to expand the cache up to the maximum cache size (i.e., $N_{max}^c$).

Each cache entry in group 600 stores a specific logical address to physical address mapping. The cache entries in 600a are the ones that are currently in the cache where $N^c$ (i.e., the number of entries currently in the cache) varies over time. For example, in diagram 300 in FIG. 3, $N^c=10$; in diagram 310, $N^c=8$; in diagram 320, $N^c=6$. The cache entries in 600b are the ones that have been most recently evicted from the cache. The cache entries in 600 are connected using a doubly linked list where the list is sorted according to access. Entry $e_1$ is the most recently used cache entry (currently in the cache), $e_{N^c}$ is the least recently used cache entry (currently in the cache), $e_{N^c+1}$ is the entry most recently evicted from the cache, and $e_{N_{max}^c}$ is the entry which was evicted from the cache the longest time ago.

Hit counters 602a are used to track hit counts for entries currently in the cache and hit counters 602b are used to track hit counts for entries which have been (most recently) evicted from the cache. The hit counts tracked correspond to the respective locations or positions within the sorted list, not the specific logical address to physical address mapping stored in an entry. To put it another way, the cache entries in 600 are constantly being resorted but the hit counters in 602 remain in the same order or sequence. Note, for example, that hit counters 602 are not implemented as a doubly-linked list (unlike 600) because the hit counters will not be resorted or reordered and so double links are not needed. The following figure describes an example of this in more detail.

Figure 7:
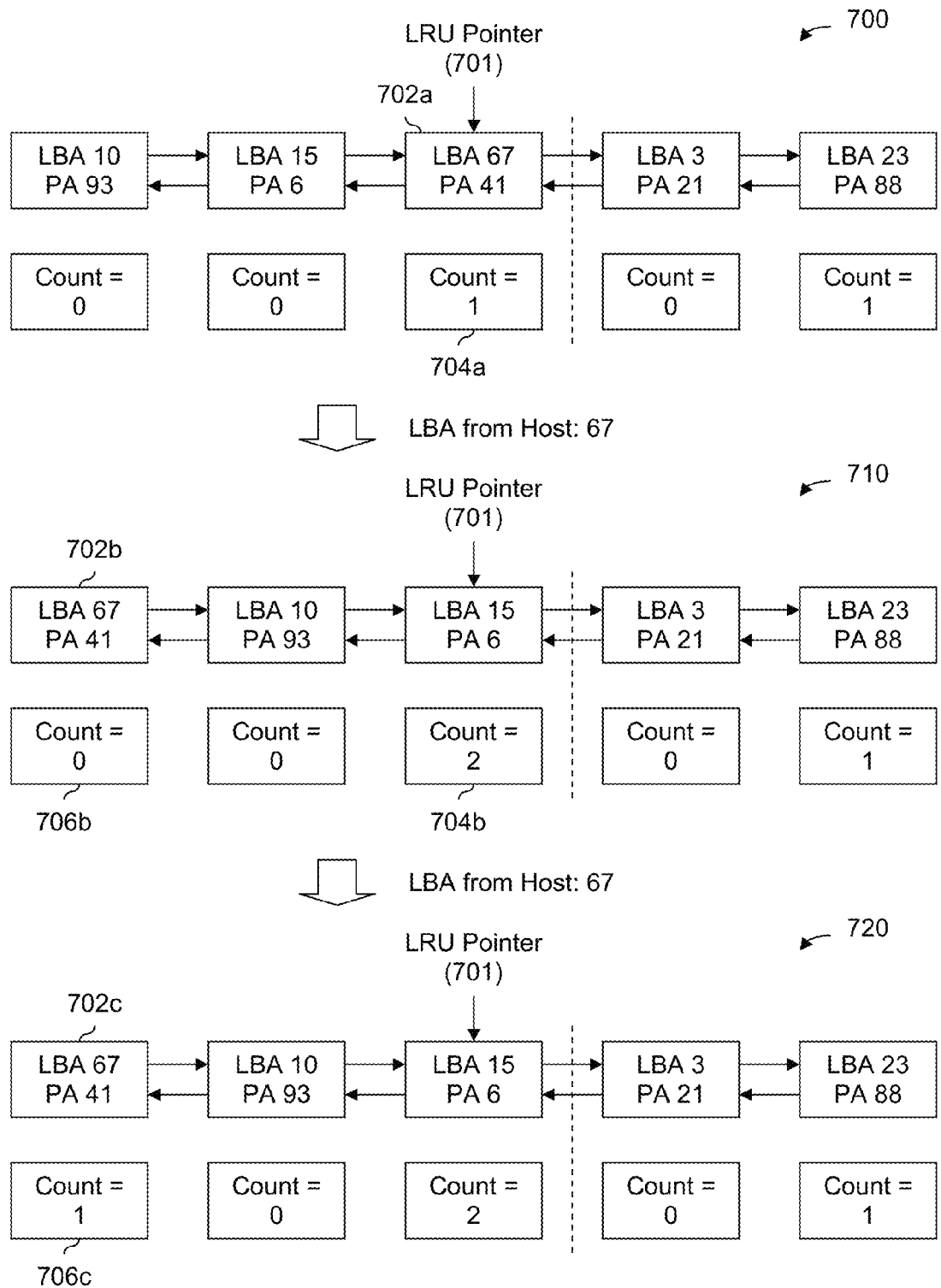
FIG. 7 is a diagram illustrating an embodiment of incremented hit counters at various points in time.

FIG. 7 is a diagram illustrating an embodiment of incremented hit counters at various points in time. In the example shown, $N_{max}^c=5$ so hit counts are tracked for five entries total (i.e., some combination of entries currently in the cache and entries evicted from the cache). To track which entries are in the cache and which entries have been evicted from the cache, a least recently used (LRU) pointer (701) is used. The LRU pointer points to the least recently used entry that is still in the cache. As such, the entry pointed to by the LRU pointer and all entries to the left of that entry are (currently) in the cache. All entries strictly to the right of the LRU pointer have been evicted from the cache. For clarity, the number of entries in the cache (in this example, 3) and the number of entries evicted (in this example, 2) are kept constant throughout diagrams 700, 710, and 720 for clarity.

Diagram 700 shows the logical-to-physical address mappings stored in the entries and the hit counts at an exemplary point in time. A logical block address is then received from the host, for example as part of a read instruction or a write instruction. The received logical block address is 67, which corresponds to entry 702a in diagram 700, the least recently used entry in the cache.

The corresponding hit counter is counter 704a, which has a hit count of 1 in diagram 700. That counter is incremented and as is shown in diagram 710, count 704b is now 2 to reflect the hit. As diagram 710 also shows, the logical-to-physical address mapping with a logical block address of 67 has moved to the most recently used position (see, e.g., entry 702b in diagram 710) and the other mappings have shifted to the right to make space. Note that the hit counters do not rearrange themselves between diagrams 700 and 710 even though the logical-to-physical address mappings have been rearranged.

Subsequently, after the state shown in diagram 710, the same logical block address of 67 is received again from the host. This time, the entry that has a logical block address of 67 is in the most recently used position (see, e.g., entry 702b in diagram 710). As such, the hit counter corresponding to the most recently used position is incremented from 0 (see hit counter 706b in diagram 710) to 1 (see hit counter 706c in diagram 720). Since the logical address received from the host is the same as the last logical address received, the mapping with logical block address 67 remains at the head of the linked list as the most recently used entry (note, e.g., that MRU entry 702b in diagram 710 and MRU entry 702c in diagram 720 are the same).

As is shown in this example, the hit counters do not rearrange themselves as the logical-to-physical address mappings do, but rather they track the number of hits for the logical-to-physical address mapping which they currently correspond to. If the corresponding logical-to-physical address mapping changes for a particular hit counter, the hit counter does not move with that logical-to-physical address mapping.

Figure 8:
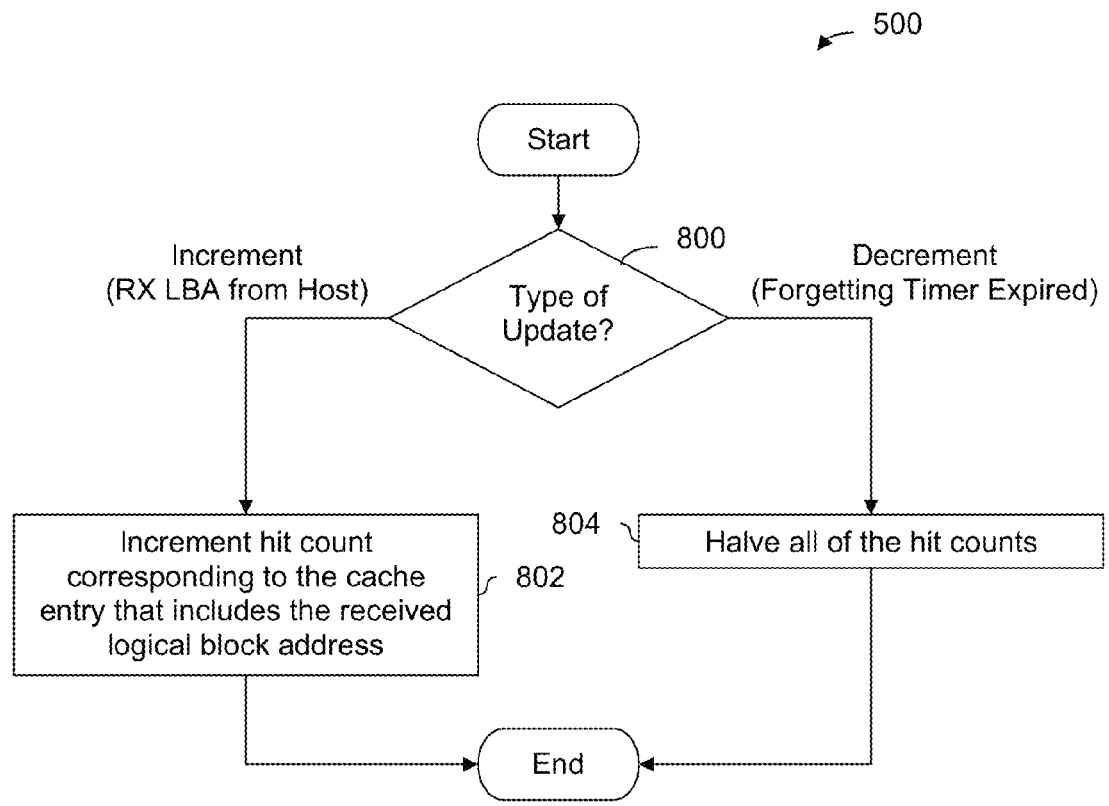
FIG. 8 is a flowchart illustrating an embodiment of a process for tracking hit counts.

FIG. 8 is a flowchart illustrating an embodiment of a process for tracking hit counts. In some embodiments, step 500 in FIG. 5 is performed in the following manner. In some embodiments, internal memory controller 118 in FIG. 1 performs the exemplary process. In some embodiments, the hit counts are stored in internal memory 112 in FIG. 1.

At 800, the type of update is determined. In this example, it is determined to increment a hit counter if a logical block address is received from a host, for example as part of a read instruction or a write instruction. If it is determined to increment at 800, the hit count corresponding to the cache entry that includes the received logical block address is incremented at 802. See, for example, the examples shown in FIG. 7.

If it is determined to increment at 800, all of the hit counts are halved at 804. For example, in FIG. 7, all five hit counters (i.e., corresponding to entries currently in the cache as well as evicted entries) would be cut in half. In some embodiments, it is determined at step 800 to decrement a hit counter if a forgetting timer expires.

In some applications, halving all hit counts when a timer expires is an acceptable estimate because the quality of the results is "good enough" and the technique is not complicated and it does not require a lot of information to be tracked. For example, one alternative is to track the timestamps at which each hit counter is updated. This would enable the hit counts to perfectly reflect the number of hits for a specified window of time. However, storing the timestamp for each hit would require a lot of memory, which is undesirable since this technique is likely to be used in systems which have a limited amount of internal memory.

Another alternative would be to zero out the hit counts when some timer expires. However, this would be undesirable because if the system needed to make a decision about whether to expand the cache immediately after the hit counts were reset, then the system would have no information available about the recent past and whether it might be worthwhile to expand the cache.

As such, using a forgetting timer and halving the hit counts when the timer expires may provide "good enough" results without being processing and/or memory intensive to implement.

Figure 9:
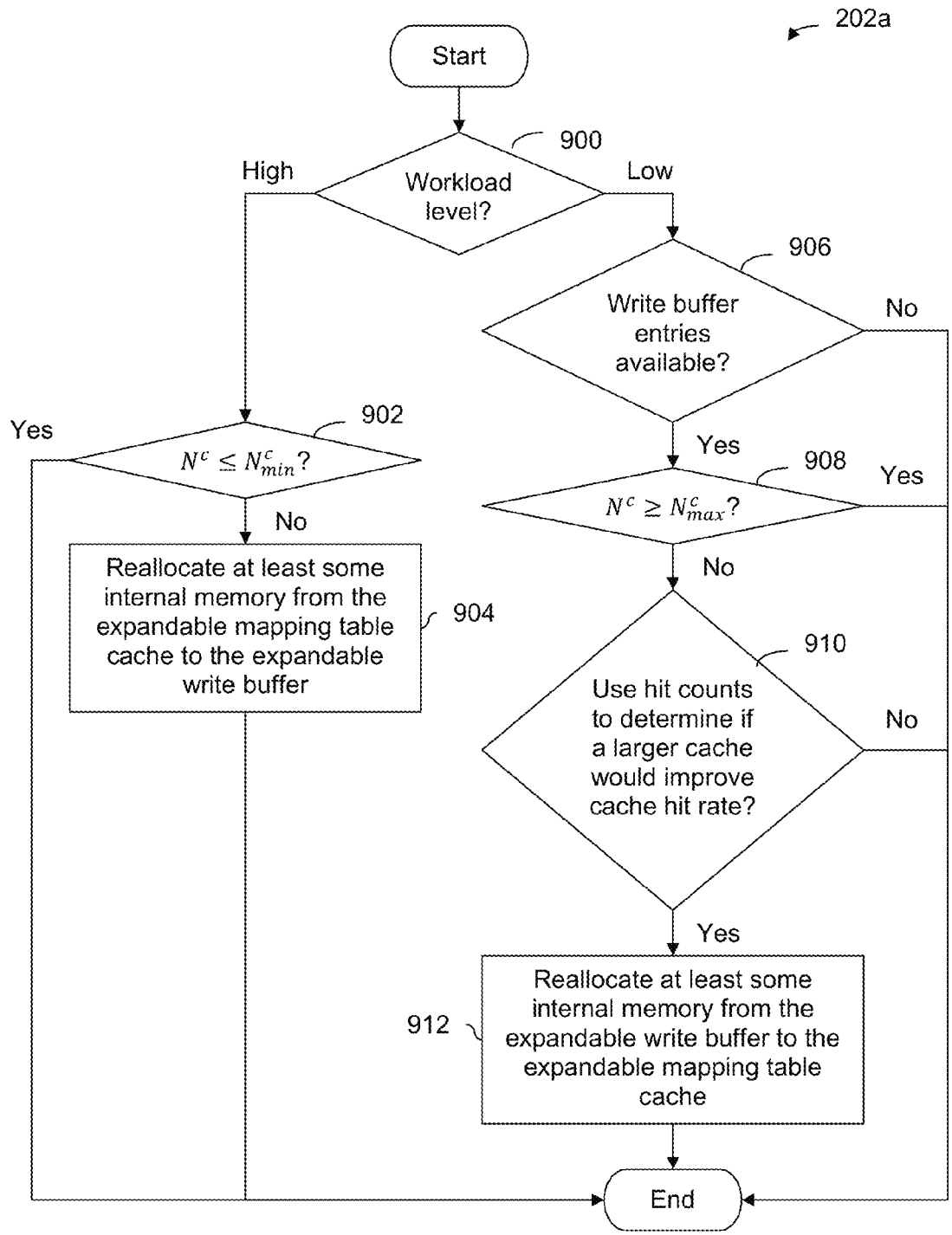
FIG. 9 is a flowchart illustrating an embodiment of a process for adjusting an amount of internal memory allocated based at least in part on hit counts.

FIG. 9 is a flowchart illustrating an embodiment of a process for adjusting an amount of internal memory allocated based at least in part on hit counts. In some embodiments, the process shown is used at step 202a in FIG. 5.

At 900, the workload level is checked. For example, the process of FIG. 4 outputs a workload level of high or low depending upon the last write instruction. If the workload level is high, it is determined at 902 if the number of entries in the expandable mapping table cache (i.e., $N^c$) is less than or equal to the minimum number of entries in the expandable mapping table cache (i.e., $N_{min}^c$). If so, the process ends. If not, at least some internal memory is reallocated from the expandable mapping table cache to the expandable write buffer at 904.

If the workload level at 900 is low, at 906 it is determined if there are write buffers available. For example, if one or more entries in the write buffer have been unoccupied for some specified period of time, they may be considered free and available for reallocation to the expandable mapping table cache. If not, the process ends.

If, however, there are write buffers available at 906, it is determined if the number of entries in the expandable mapping table cache is greater than or equal to the maximum number of entries in the expandable mapping table cache at 908. If so, the process ends.

If, however, the number of entries in the expandable mapping table cache has not exceeded the maximum, at 910 the hit counts are used to determine if a larger cache would improve the cache hit rate. For example, suppose three entries in the write buffer are determined to be available at 906. The hit count for the three most recently evicted entries are added and compared to a threshold (e.g., which may be scaled based on the number of entries being considered). If the sum of the hit counts is greater than a threshold, it is decided the cache hit rate would be improved. If the sum is less than the threshold, then it is decided that the cache hit rate would not be improved.

If the cache hit rate would be improved at 910, at least some internal memory is reallocated from the expandable write buffer to the expandable mapping table cache at 912. To continue the example from above, the three entries for which the sum of hit counts was used at step 910 would be reallocated to the cache at step 912. If the cache hit rate would not be improved at 910, then the process ends without reallocating internal memory from the expandable write buffer to the expandable mapping table cache because it is not worth the cost of performing the reallocation.

In some embodiments, a threshold used at step 910 is an adjustable threshold. Using an adjustable threshold is desirable because then it can be adjusted based on the associated cost of relocating internal memory from a data buffer to the cache. In a system with a higher reallocation cost, the threshold is set to a higher value. In systems where the reallocation cost is lower, a lower threshold value is used.

When downsizing the expandable mapping table cache and expanding the expandable data buffer, it may be desirable to have some entries ready to be discarded that are less expensive to discard. The following figures describe various embodiments of this which may make the reallocation process faster.

Figure 10:
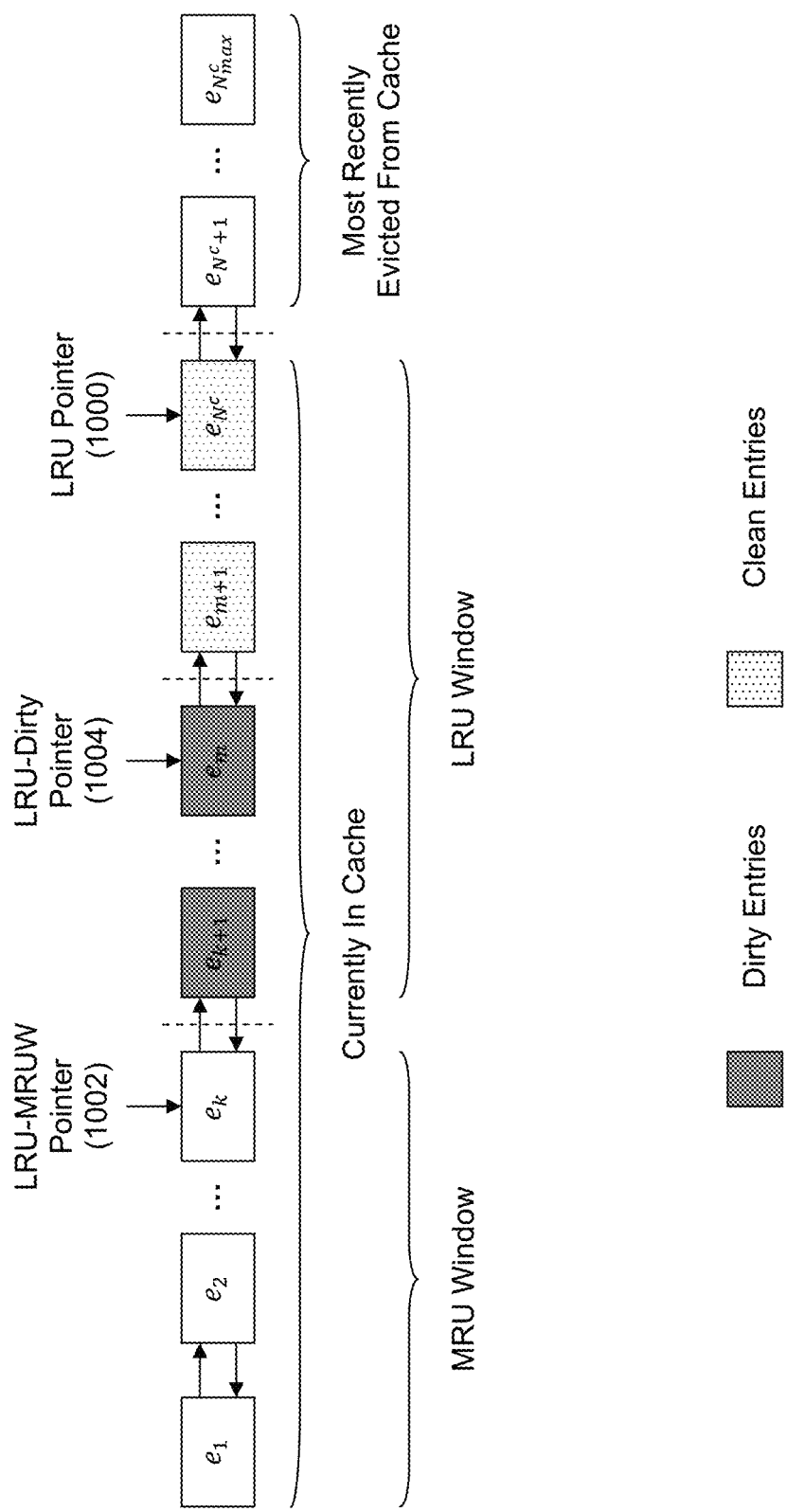
FIG. 10 is a diagram illustrating an embodiment of an LRU window which includes dirty entries and clean entries.

FIG. 10 is a diagram illustrating an embodiment of an LRU window which includes dirty entries and clean entries. In the example shown, a doubly-linked list of entries associated with an expandable mapping table cache is shown. As described above, LRU pointer 1000 is used to track which entries are currently in the cache and which entries have been evicted.

In addition to LRU pointer 1000, there is LRU-MRUW pointer 1002, which is used to divide the entries which are currently in the cache into a most recently used (MRU) window (in this example, those entries to the left of LRU-MRUW pointer 1002 and pointed to by LRU-MRUW pointer 1002) and an LRU window (in this example, those entries between LRU-MRUW pointer 1002 and LRU pointer 1000, excluding the entry pointed to by LRU-MRUW pointer 1002).

In some embodiments, the size of the MRU window (i.e., k) is a constant size and the size of the LRU window varies as the cache size changes. In some embodiments, the size of the MRU window (i.e., k) is selected such that $k = N_{min}^c - N_{evict}$ where $N_{evict}$ is a desired number of entries to evict (e.g., if the host sends down a long write, the number of entries desired to be evicted from the cache).

Within the LRU window, the dirty entries and clean entries are sorted so that the clean entries are closest to the evicted entries and the dirty entries are closest to the MRU window. LRU-dirty pointer 1004 is used to track the division between dirty entries and clean entries in the LRU window. As used herein, a dirty entry is one for which the logical-to-physical address mapping stored in the cache (e.g., cache 116 in FIG. 1) does not match the logical-to-physical address mapping stored on external storage (e.g., on mapping table 122 in FIG. 1). As such, if a dirty entry is evicted from the cache (e.g., because that internal memory is being reallocated to the data buffer), an update to the external storage will also be required. In contrast, a clean entry is one for which the logical-to-physical address mapping in the cache and the external storage match. As such, no update to the mapping table stored on external storage is needed.

When entries are evicted from the cache so that they can be used by the write buffer (or, more generally, the data buffer), the eviction is done by moving LRU pointer 1000 the appropriate number of entries to the left. As such, the first entries that will be evicted will be the clean entries using the example implementation shown. Only when all of the clean entries have been evicted will the dirty entries start to be evicted. This is desirable because it may be possible to evict some entries from the cache without having to update the mapping table stored on external storage (e.g., which may delay some other access to the external storage).

In some embodiments, a process operates in the background to reorder entries in the doubly-linked list as entries in the LRU window become dirty. In the event a clean entry becomes dirty (e.g., because the physical address in a mapping in the cache changes, such that the mapping in the cache no longer matches that in the external storage), that entry is removed from its location with the clean entries and is moved with the dirty entries.

In some embodiments, to ensure that the supply of clean entries is continually refreshed, a cleanup process may commit changes in dirty entries in the LRU window to the mapping table in external storage so that an entry becomes clean. To obviate the need to rearrange entries in the doubly-linked list, in some embodiments the entry pointed to by LRU-dirty pointer 1004 is the one for which changes are committed. After the changes are committed to the mapping table in external memory, the LRU-dirty pointer is shifted one entry to the left without having to rearrange the doubly-linked list. In some embodiments, such a cleanup process is initiated when the number of clean entries in the LRU window is less than some threshold. In some embodiments, the cleanup process stops when the number of clean entries in the LRU window reaches another threshold.

Figure 11:
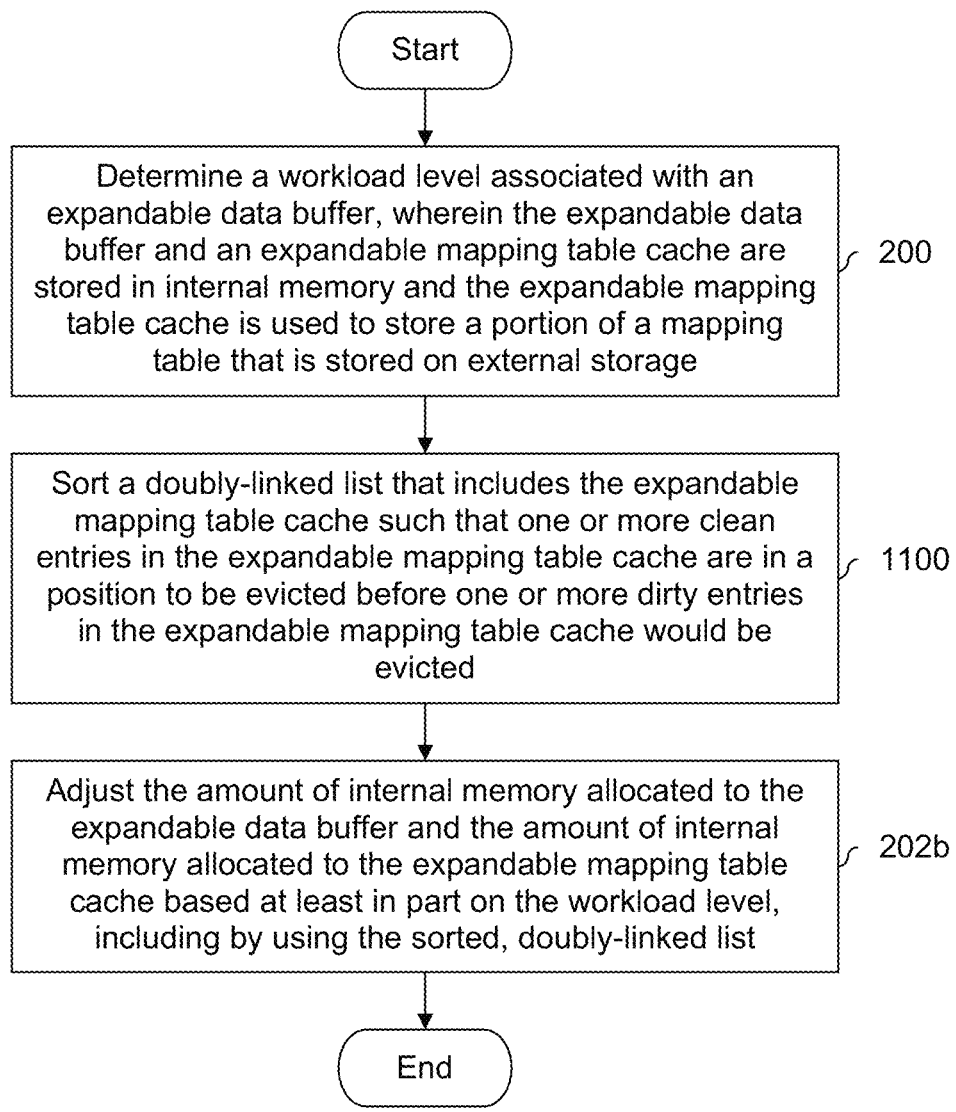
FIG. 11 is a flowchart illustrating an embodiment of a workload-based, internal memory reallocation process that uses a sorted, doubly-linked list.

FIG. 11 is a flowchart illustrating an embodiment of a workload-based, internal memory reallocation process that uses a sorted, doubly-linked list. FIG. 11 is similar to FIG. 2 and identical or similar reference numbers are used for related steps.

At 200, a workload level associated with an expandable data buffer is determined, wherein the expandable data buffer and an expandable mapping table cache are stored in internal memory and the expandable mapping table cache is used to store a portion of a mapping table that is stored on external storage.

At 1100, a doubly-linked list that includes the expandable mapping table cache is sorted such that one or more clean entries in the expandable mapping table cache are in a position to be evicted before one or more dirty entries in the expandable mapping table cache would be evicted. See, for example, FIG. 10. In that example, the clean entries (i.e., $e_{m+1}, \ldots, e_{N^c}$) would be discarded first before the dirty entries (i.e., $e_{k+1}, \ldots, e_m$).

At 202b, the amount of internal memory allocated to the expandable data buffer and the amount of internal memory allocated to the expandable mapping table cache are adjusted based at least in part on the workload level, including by using the sorted, doubly-linked list. For example, if one or more entries in the expandable mapping table cache need to be evicted, then in the example of FIG. 11, the LRU pointer 1000 would be shifted to the left, such that the clean entries would be evicted first, followed by the dirty entries.

In some embodiments, the dirty entries within an LRU window are sorted based on some criteria so that less costly dirty entries are evicted before more expensive dirty entries. The following describes one such example.

Figure 12:
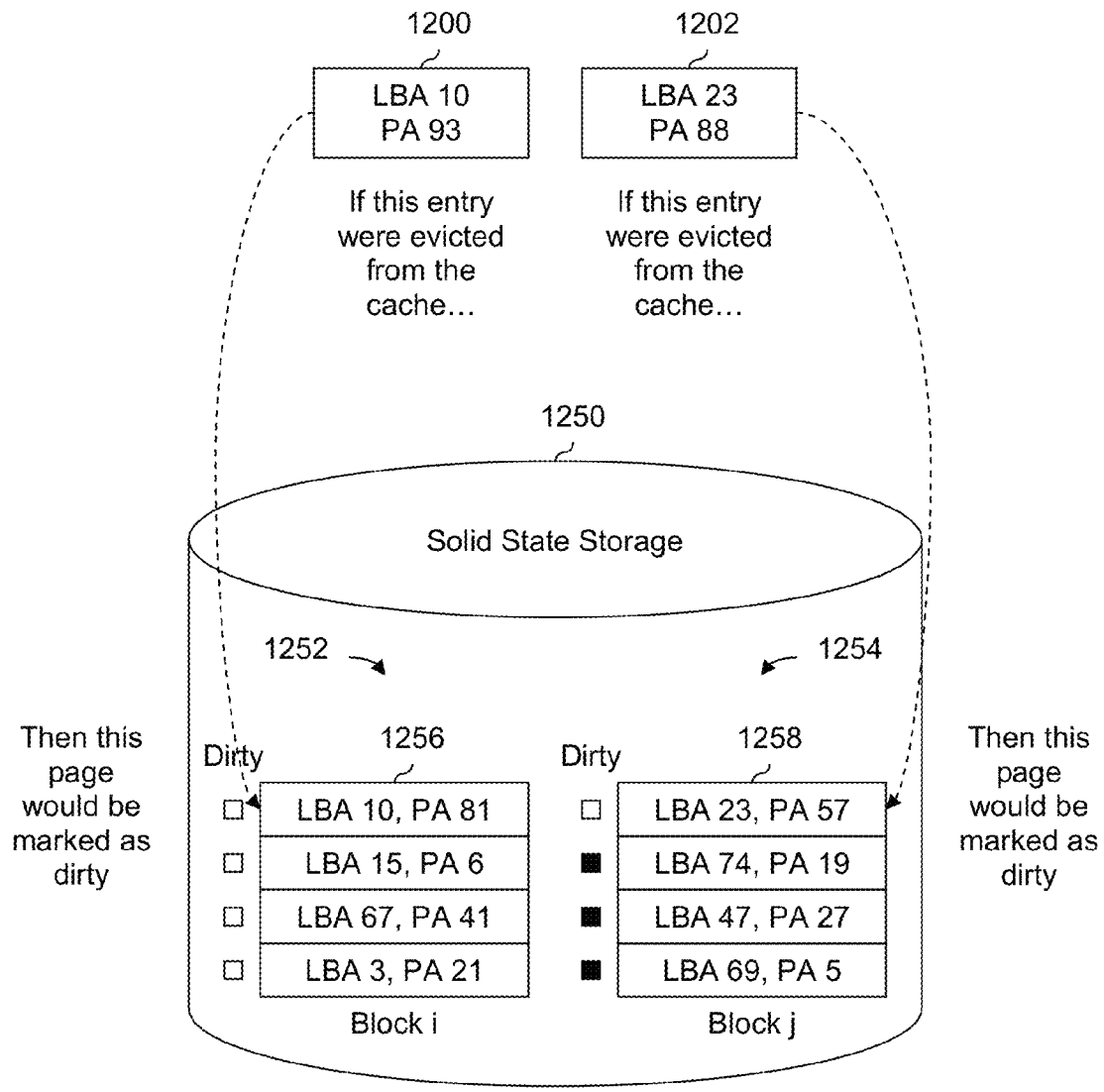
FIG. 12 is a diagram illustrating an embodiment of dirty page counts which are used to sort dirty entries in an LRU window.

FIG. 12 is a diagram illustrating an embodiment of dirty page counts which are used to sort dirty entries in an LRU window. In the example shown, dirty entries 1200 and 1202 are being evaluated so they can be sorted within an LRU window so that dirty entries that are less expensive (or otherwise preferable in some manner) are evicted before more expensive dirty entries. For example, in FIG. 10, the entries in the LRU window may be sorted so that entry $e_m$ is the least expensive entry to evict, entry $e_{m-1}$ is the second least expensive entry to evict, and so on.

Dirty entry 1200 is stored in block 1252 on solid state storage 1250 and dirty entry 1202 is stored in block 1254. In this example, each block includes four pages and (for convenience) each cache entry (i.e., each logical-to-physical address mapping) occupies a page. Each page in the block has a dirty bit associated with it, indicating whether that page is dirty and thus is out of date. If dirty entry 1200 were discarded from the cache, then the dirty bit corresponding to page 1256 in block 1252 would be set. In contrast, if dirty entry 1202 were discarded from the cache, then the dirty bit corresponding to page 1258 in block 1254 would be set. In this example, the dirty bits have not been set for pages 1256 and 1258 because pages in solid state storage 1250 are not marked as dirty until the change is committed or otherwise communicated from the cache to the solid state storage (e.g., because a particular logical-to-physical address mapping has been evicted from the cache, or because dirty entries in the cache are being proactively committed to solid state storage in order to become clean entries so that if a long write command comes down from the host there will be sufficient clean entries in the cache to evict quickly and/or easily).

From the state of dirty bits shown, the dirty bit count for entry 1200 is 0 and the dirty bit count for entry 1202 is 3. The dirty bit counts are used in this example to decide what order dirty entries 1200 and 1202 should be in. To put it another way, the dirty bit counts are used to sort dirty entries in the LRU window so that the order reflects some metric or cost.

In some embodiments, the system is configured to be in a "reclamation" mode where the system attempts to discard pages first that will cause a garbage collection or other reclamation process to be triggered. For example, if dirty entry 1202 were discarded, then all of the pages in block 1254 would be marked as dirty and a reclamation process could reclaim block 1254 for use. As such, in some cases it may be desirable to discard dirty pages with higher dirty bit counts before those with lower dirty bit counts and the LRU window is sorted accordingly.

In some embodiments, the system is configured to be in an "avoid reclamation" mode where the system attempts to delay or avoid garbage collection or other reclamation processes until absolutely necessary (e.g., for power consumption reasons). For example, if dirty entry 1200 were discarded, then only one page in block 1252 would be dirty and the number of dirty pages may be low enough so that a garbage collection or other reclamation process is not (e.g., automatically) triggered. In this configuration, dirty pages with lower dirty bit counts are discarded before those with higher dirty bit counts and the LRU window is sorted accordingly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an internal memory including an expandable data buffer and an expandable mapping table cache; and
an internal memory controller configured to:
determine a workload level associated with the expandable data buffer, wherein the expandable data buffer and the expandable mapping table cache are stored in internal memory and the expandable mapping table cache is used to store a portion of a mapping table that is stored on external storage, the workload level is set to high if a last write instruction is a long write and the workload level is set to low if the last write instruction is a short write; and
adjust an amount of internal memory allocated to the expandable data buffer and an amount of internal memory allocated to the expandable mapping table cache based at least in part on the workload level.

2. The system of claim 1, wherein the system includes a semiconductor device, including one or more of the following: an application-specific integrated circuit (ASIC) or a field-programmable gate array (FPGA).

3. The system of claim 1 further comprising the external storage that includes the mapping table.

4. The system of claim 1, wherein:
the internal memory controller is further configured to track one or more hit counts associated with one or more cache entries that have been evicted from the expandable mapping table cache; and
the internal memory controller is configured to adjust further based at least in part on: a minimum number of cache entries, a maximum number of cache entries, and the hit counts associated with the cache entries that have been evicted.

5. The system of claim 4, wherein the internal memory controller is configured to track, including by:
determining a type of update, wherein:
in the event a logical block address is received from a host, it is determined to increment; and
in the event a forgetting timer expires, it is determined to decrement;
in the event it is determined to increment, incrementing a hit count corresponding to a cache entry that includes the received logical block address; and
in the event it is determined to decrement, halving all of the hit counts.

6. The system of claim 1, wherein:
the internal memory controller is further configured to sort a doubly-linked list that includes the expandable mapping table cache such that one or more clean entries in the expandable mapping table cache are in a position to be evicted before one or more dirty entries in the expandable mapping table cache would be evicted; and
the internal memory controller is configured to adjust, including by using the sorted doubly-linked list.

7. The system of claim 6, wherein the internal memory controller is further configured to sort the dirty entries using a dirty page count.

8. A method, comprising:
using a processor to determine a workload level associated with an expandable data buffer, wherein the expandable data buffer and an expandable mapping table cache are stored in internal memory and the expandable mapping table cache is used to store a portion of a mapping table that is stored on external storage, the workload level is set to high if a last write instruction is a long write and the workload level is set to low if the last write instruction is a short write; and
using the processor to adjust an amount of internal memory allocated to the expandable data buffer and an amount of internal memory allocated to the expandable mapping table cache based at least in part on the workload level.

9. The method of claim 8, wherein the method is performed by a semiconductor device, including one or more of the following: an application-specific integrated circuit (ASIC) or a field-programmable gate array (FPGA).

10. The method of claim 8, wherein:
the method further includes tracking one or more hit counts associated with one or more cache entries that have been evicted from the expandable mapping table cache; and
using the processor to adjust the amount of internal memory allocated to the expandable data buffer and the amount of internal memory allocated to the expandable mapping table cache is further based at least in part on: a minimum number of cache entries, a maximum number of cache entries, and the hit counts associated with the cache entries that have been evicted.

11. The method of claim 10, wherein tracking includes:
determining a type of update, wherein:
in the event a logical block address is received from a host, it is determined to increment; and
in the event a forgetting timer expires, it is determined to decrement;
in the event it is determined to increment, incrementing a hit count corresponding to a cache entry that includes the received logical block address; and
in the event it is determined to decrement, halving all of the hit counts.

12. The method of claim 8, wherein:
the method further includes sorting a doubly-linked list that includes the expandable mapping table cache such that one or more clean entries in the expandable mapping table cache are in a position to be evicted before one or more dirty entries in the expandable mapping table cache would be evicted; and
using the processor to adjust the amount of internal memory allocated to the expandable data buffer and the amount of internal memory allocated to the expandable mapping table cache further includes using the sorted doubly-linked list.

13. The method of claim 12 further comprising sorting the dirty entries using a dirty page count.

14. A computer program product, the computer program product being embodied in a non-transitory computer readable storage medium and comprising computer instructions for:
determining a workload level associated with an expandable data buffer, wherein the expandable data buffer and an expandable mapping table cache are stored in internal memory and the expandable mapping table cache is used to store a portion of a mapping table that is stored on external storage, the workload level is set to high if a last write instruction is a long write and the workload level is set to low if the last write instruction is a short write; and
adjusting an amount of internal memory allocated to the expandable data buffer and an amount of internal memory allocated to the expandable mapping table cache based at least in part on the workload level.

15. The computer program product of claim 14, wherein:
the computer program product further includes computer instructions for tracking one or more hit counts associated with one or more cache entries that have been evicted from the expandable mapping table cache; and
the computer instructions for adjusting the amount of internal memory allocated to the expandable data buffer and the amount of internal memory allocated to the expandable mapping table cache further include computer instructions for adjusting based at least in part on: a minimum number of cache entries, a maximum number of cache entries, and the hit counts associated with the cache entries that have been evicted.

16. The computer program product of claim 15, wherein the computer instructions for tracking include computer instructions for:
determining a type of update, wherein:
in the event a logical block address is received from a host, it is determined to increment; and
in the event a forgetting timer expires, it is determined to decrement;
in the event it is determined to increment, incrementing a hit count corresponding to a cache entry that includes the received logical block address; and
in the event it is determined to decrement, halving all of the hit counts.

17. The computer program product of claim 14, wherein:
the computer program product further includes computer instructions for sorting a doubly-linked list that includes the expandable mapping table cache such that one or more clean entries in the expandable mapping table cache are in a position to be evicted before one or more dirty entries in the expandable mapping table cache would be evicted; and
the computer instructions for adjusting the amount of internal memory allocated to the expandable data buffer and the amount of internal memory allocated to the expandable mapping table cache further include computer instructions for using the sorted doubly-linked list.

18. The computer program product of claim 17 further comprising computer instructions for sorting the dirty entries using a dirty page count.

* * * * *